United States Patent
Allstrom et al.

(10) Patent No.: US 12,135,228 B2
(45) Date of Patent: Nov. 5, 2024

(54) VORTEX FLOWMETER

(71) Applicant: Schneider Electric Systems USA, Inc., Foxboro, MA (US)

(72) Inventors: Peter Allstrom, Warwick, RI (US); Briane Ritchie, Bellingham, MA (US)

(73) Assignee: SCHNEIDER ELECTRIC SYSTEMS USA, INC., Foxboro, MA (US)

( * ) Notice: Subject to any disclaimer, the term of this patent is extended or adjusted under 35 U.S.C. 154(b) by 1165 days.

(21) Appl. No.: 16/915,070

(22) Filed: Jun. 29, 2020

(65) Prior Publication Data

US 2020/0326214 A1 Oct. 15, 2020

Related U.S. Application Data

(62) Division of application No. 14/618,470, filed on Feb. 10, 2015, now Pat. No. 10,739,171.

(51) Int. Cl.
- *G01F 1/325* (2022.01)
- *G01F 1/00* (2022.01)
- *G01F 15/06* (2022.01)

(52) U.S. Cl.
CPC ............ *G01F 1/3259* (2022.01); *G01F 1/007* (2013.01); *G01F 15/068* (2013.01)

(58) Field of Classification Search
CPC ....... G01F 1/007; G01F 1/3259; G01F 15/068
See application file for complete search history.

(56) References Cited

U.S. PATENT DOCUMENTS

| | | | |
|---|---|---|---|
| 7,197,408 B2 | 3/2007 | Ferreira et al. | |
| 7,233,917 B2 | 6/2007 | Burgarin et al. | |
| 7,515,977 B2 | 4/2009 | Euyurek et al. | |
| 7,516,023 B2 | 4/2009 | Ferreira et al. | |
| 7,565,309 B2 | 7/2009 | Hansell et al. | |
| 7,925,456 B2 | 4/2011 | McAnally et al. | |
| 8,239,157 B2 | 8/2012 | McAnally et al. | |
| 2005/0171708 A1* | 8/2005 | Ferreira | G06Q 30/0621 702/45 |
| 2009/0059814 A1 | 3/2009 | Nixon et al. | |
| 2009/0301219 A1* | 12/2009 | Oda | G01F 1/86 73/861.22 |
| 2011/0022979 A1* | 1/2011 | Meier | G01F 1/363 715/810 |
| 2013/0204466 A1 | 8/2013 | Ricci | |

OTHER PUBLICATIONS

Series FV-200 Vortex Shedding Flow Meter (Year: 2007).*
Multivariable Mass Vortex (Year: 2009).*

* cited by examiner

*Primary Examiner* — Mohamed Charioui
*Assistant Examiner* — Dacthang P Ngo
(74) *Attorney, Agent, or Firm* — Stinson LLP

(57) ABSTRACT

A menu navigation engine that enables user configuration of a vortex flowmeter. The vortex flowmeter includes a memory device and a processor, among other hardware components. Software instructions stored on the memory device and executable by the processor implement the menu navigation engine by displaying use case identifiers on the user interface, receiving selections of use case identifiers via the user interface, generating a formatted hierarchical tree of vortex flowmeter configuration nodes associated with the selected use case, and displaying the generated tree on the user interface.

13 Claims, 11 Drawing Sheets

FIG. 5

| | | | |
|---|---|---|---|
| 107 — CFG_1 | Pulse_Available | |
| 110 — CFG_2 | Pulse_Totalizer | |
| 113 — CFG_3 | MA_Live | |
| 116 — CFG_4 | MA_Fixed | |
| 119 — CFG_5 | Pressure_Live | Configuration Dependency Checks |
| 122 — CFG_6 | Ecep | |
| 125 — CFG_7 | GasPurge | |
| 128 — CFG_8 | Pipe_Mate | |
| 131 — CFG_9 | Pipe_Piping | |
| 134 — CFG_10 | LIQUID | |
| 137 — CFG_11 | GAS | |
| 140 — CFG_12 | VAPOR | (upto 16) |
| CFG_13 | | |
| CFG_14 | | |
| CFG_15 | | |
| CFG_16 | | |

FIG. 6

| | | | |
|---|---|---|---|
| 143 — Per_1 | M84C | | |
| 146 — Per_2 | M84 | | |
| 149 — Per_3 | M84LowPower | | |
| 152 — Per_4 | OilandGas | | |
| 155 — Per_5 | ProducedWater | | |
| 158 — Per_6 | Steam | | |
| 161 — Per_7 | Gas | Personality Visibility | |
| 164 — Per_8 | SaturatedSteam | (Personalities are defined in Parameters.xls) | |
| Per_9 | | (upto 16) | |
| Per_10 | | | |
| Per_11 | | | |
| Per_12 | | | |
| Per_13 | | | |
| Per_14 | | | |
| Per_15 | | | |
| Per_16 | | | |

VORTEX FLOWMETER

CROSS-REFERENCE TO RELATED APPLICATION

This application is a divisional of U.S. patent application Ser. No. 14/618,470 filed Feb. 10, 2015, the entire disclosure of which is incorporated herein by reference.

BACKGROUND

Vortex flowmeters measure fluid flow rate by detecting the frequency of disturbances in the flow of process fluid. Such flowmeters typically include embedded systems for communicating with control systems, and for generating outputs related to the disturbances detected in the process fluid passing through the flowtube of the vortex flowmeter. The settings of the embedded systems are often configurable by navigating through a series of menus presented on a typical vortex flowmeter's user interface. Since vortex flowmeters are application specific, many of the possible configuration settings pertaining to the embedded systems of the flowmeter are never used when the flowmeter is configured. However, a user must still navigate by keystrokes through the unused configuration settings via the menus. For this reason, the number of keystrokes required to navigate a menu tree in order to configure a flowmeter results in an inefficient and error-prone configuration process.

A need exists to provide a user with a configuration menu engine that is more efficient to navigate, as well as less error prone and reduces the amount of flash memory needed for operation of the menu engine. This is especially true given that the interface on which the menu is navigated typically comprises a simple liquid crystal display (LCD) with 2-4 lines of 8-16 characters per line.

SUMMARY

Briefly, aspects of the present invention relate to the fields of distributed control system devices, such as flowmeters, and more particularly to systems and methods to expedite the menu-driven configuration of such devices through the use of a simplified configuration menu tree. The use of an improved menu engine to simplify a configuration menu allows a user to more efficiently configure a vortex flowmeter by reducing the number of information items, also called menu nodes, that the user must navigate during the configuration process. To this end, aspects of the present invention enable a more efficient process by reducing the information items displayed to a user based upon, among other factors, the specific application (also called a "use case" or a "personality") in which the vortex flowmeter will be used. Rather than requiring the user to navigate each information item in the entire hierarchical menu tree, aspects of the present invention provide for the navigation of a reduced number of information items. By enabling menu navigation in this manner, the desirable result of facilitating more efficient and less error prone flowmeter configuration, with less action required upon the user interface, is achieved.

In an aspect, a menu navigation engine enables user configuration of a vortex flowmeter. The vortex flowmeter includes a flowtube, a bluff body, a vortex sensor, a processor, a user interface, and a memory device coupled to the processor. The menu navigation engine is implemented by software components that are executable by the processor and stored on the memory device. The menu navigation engine displays one or more use case identifiers on the user interface, each representing an expected usage of the flowmeter. Further, the menu navigation engine receives a selection of use case identifiers corresponding to a use case via the user interface, generates a formatted hierarchical tree of vortex flowmeter configuration nodes associated with the selected use case, and displays the generated tree on the user interface.

In another aspect, a system for implementing a menu navigation engine enables user configuration of a vortex flowmeter, and comprises one or more processors, a parameter database storing data related to default values for vortex flowmeter configuration nodes, a user menu database storing data related to the layout of a complete hierarchical tree of vortex flowmeter configuration nodes, and a memory storing one or more components that are executable by the one or more processors. The components comprise an initialization component to access the parameter database and the user menu database to initialize the default values of a flowmeter database. The components further comprise a menu navigation engine component for configuring a vortex flowmeter menu as set forth above.

In yet another aspect, a method for configuring a vortex flowmeter is provided.

Other objects and features will be in part apparent and in part pointed out hereinafter.

BRIEF DESCRIPTION OF THE DRAWINGS

FIG. 5 is an exemplary depiction of configuration checks utilized by a flowmeter device in accordance with one embodiment of the present invention.

FIG. 6 is an exemplary depiction of personality checks utilized by a flowmeter device in accordance with one embodiment of the present invention.

Corresponding reference characters indicate corresponding parts throughout the drawings.

DETAILED DESCRIPTION

Aspects of the present invention improve the configuration efficiency of a field device such as a vortex flowmeter by providing a menu engine capable of optimizing menu structures in accordance with the specific application for which the vortex flowmeter will be used.

Figure 1:
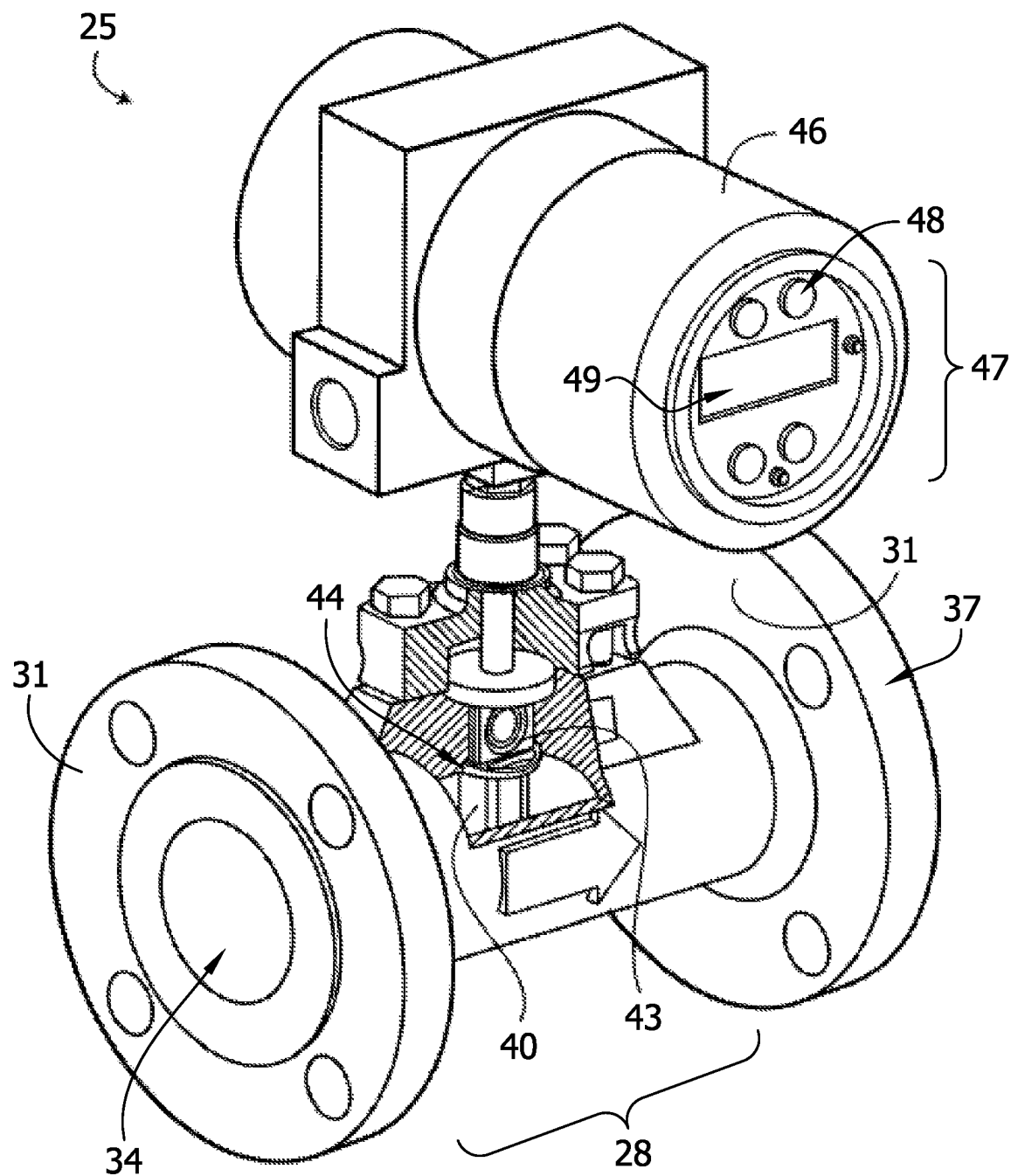
FIG. 1 is a perspective of one embodiment of a vortex flowmeter with a user interface in accordance with one embodiment of the present invention.

Referring now to the drawings, first to FIG. 1, one embodiment of a vortex flowmeter for measuring fluid flow rate is generally designated 25. The vortex meter 25 includes a flowtube 28 through which a fluid can flow. The flowtube 28 is suitably configured for installation in a fluid flow line (not shown). For example, process connections 31 (e.g., flanges) are on the opposite ends of the flowtube 28 for connecting the inlet 34 and outlet 37 of the flowtube 28 to the ends of pipes in a pipeline. It is also common in the industry to use a so-called wafer connection to install a flowmeter in a fluid line and the flowtube 28 can be adapted for a wafer connection (or any other type of connection) if desired.

Figure 9A:
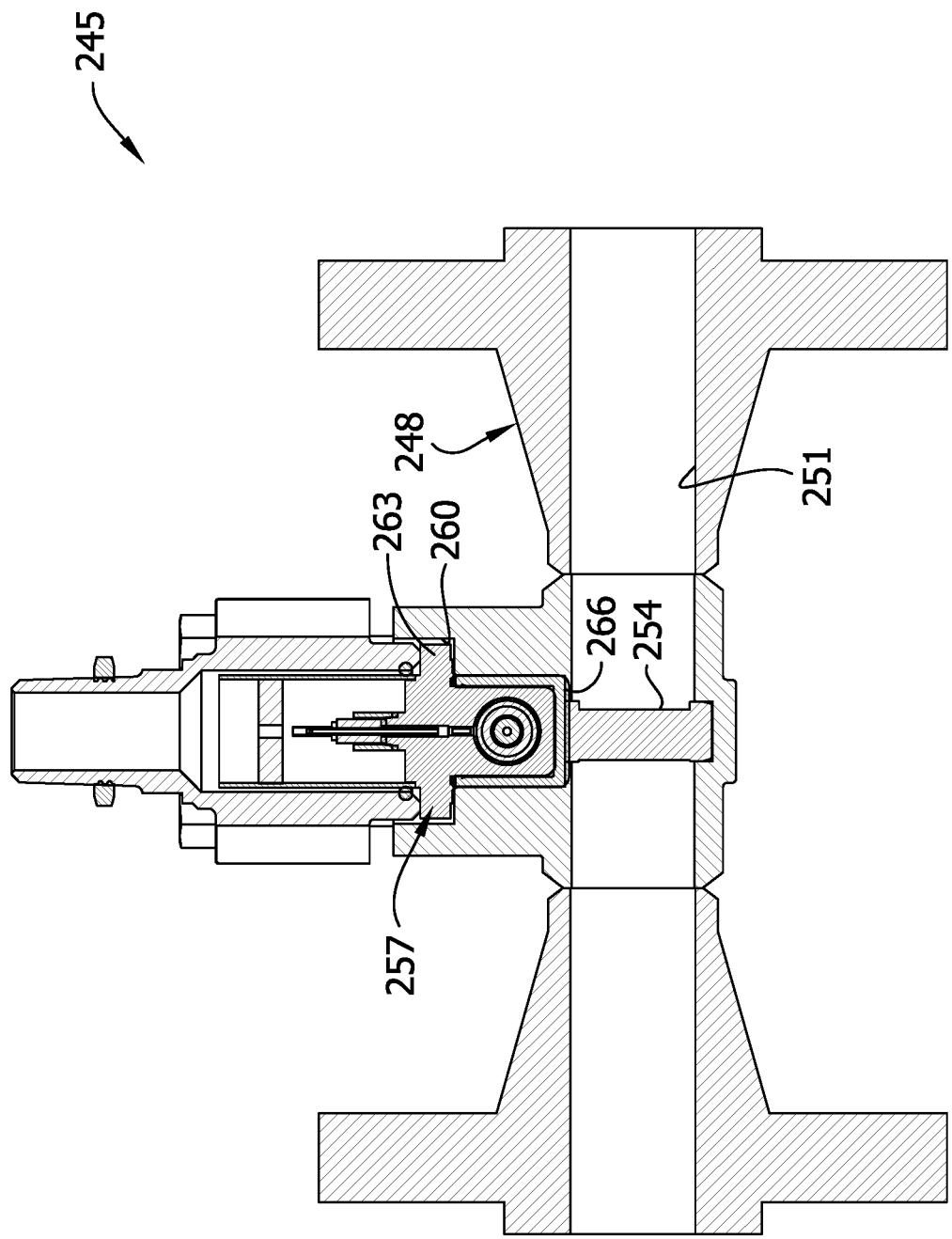
FIG. 9A is a cross section of a side elevation of a vortex flowmeter in accordance with one aspect of the present invention.
Figure 9B:
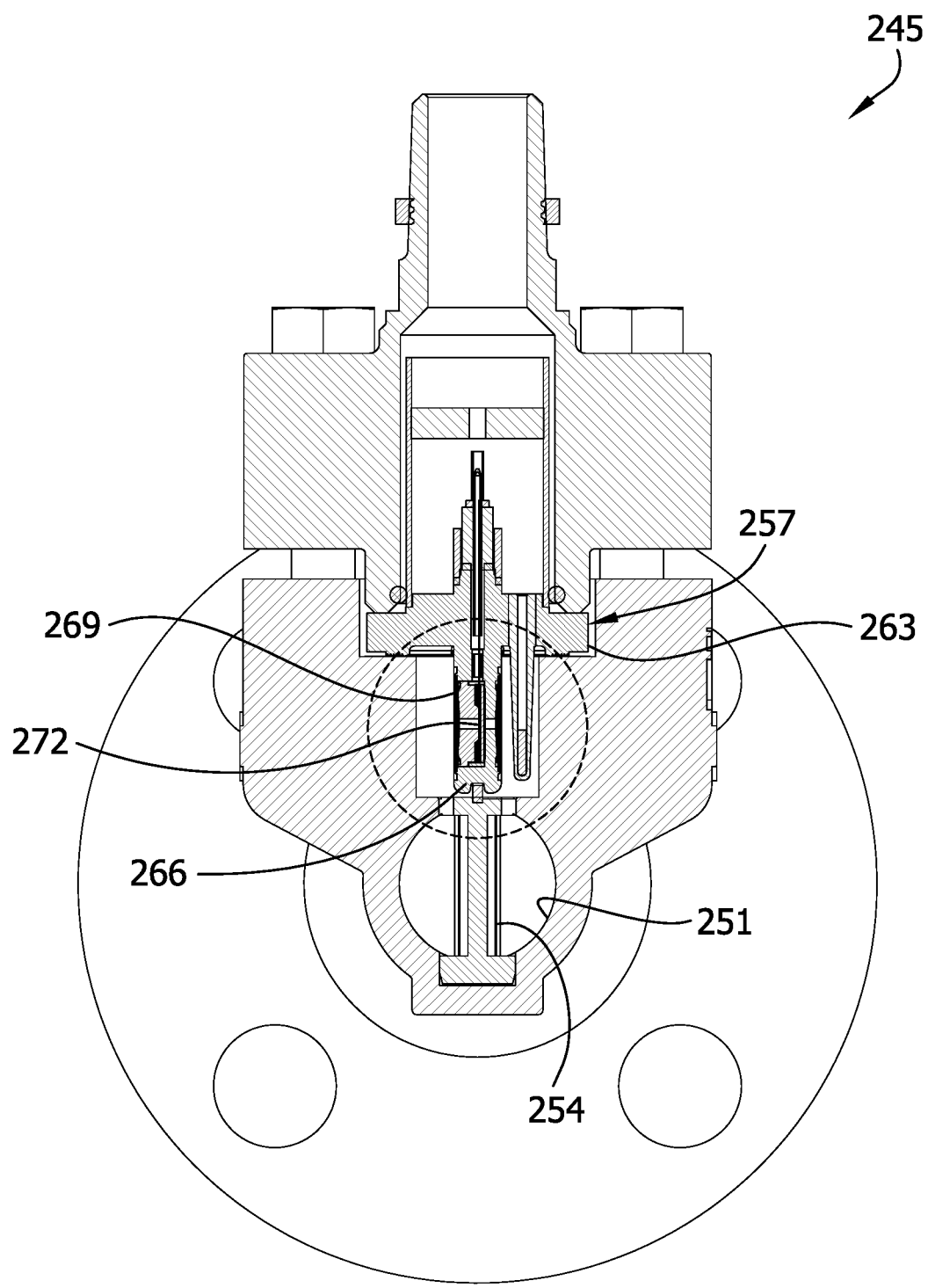
FIG. 9B is a cross section of a front elevation of a vortex flowmeter in accordance with one embodiment of the present invention.

A bluff body 40 (sometimes referred to in the industry as a vortex shedder or shedder bar) is positioned in the flowtube 28, as illustrated in FIGS. 9A-9B. The bluff body 40 is a structure that partially obstructs fluid flow through the flowtube 28 for the purpose of generating vortices in the fluid when the fluid flows through the flowtube 28. The frequency of the vortices is proportional to the velocity of the fluid for a relatively wide range of flow conditions. Because the cross sectional flow area of the flowtube 28 at the bluff body 40 is constant, the frequency of vortices is also proportional to the volumetric flow rate. This phenomenon is well known to those skilled in the art and need not be discussed in detail. Moreover, if the density of the fluid is known or measured, the mass flow rate can be derived from the measured volumetric flow rate.

Broadly speaking, the bluff body 40 can have any configuration as long as it is able to generate vortices in a fluid stream flowing past the bluff body 40. In the illustrated embodiment, the bluff body 40 is a substantially rigid structure having its ends affixed (e.g., welded) to the flowtube 28 to minimize movement of the bluff body 40 in response to pressure fluctuations associated with vortices formed by the bluff body 40. However, the bluff body 40 can be designed to flex or otherwise move in response to the pressure fluctuations associated with the vortices if desired.

The vortex flowmeter 25 includes a sensor 43 positioned to detect vortices generated by the bluff body 40. As illustrated, the sensor 43 is suitably positioned in a receptacle 44 in the flowtube 28 at the top of the bluff body 40. In this embodiment, the sensor 43 is in direct contact with fluid flowing through the flowtube 28. This allows the sensor 43 to sense vortices directly. However, it is contemplated that the sensor 43 can be positioned to sense vortices indirectly, such as by detecting movement of a bluff body 40 or other structure that is designed to flex or otherwise move in response to pressure fluctuations associated with the vortices formed in the fluid. In the illustrated embodiment, the sensor 43 is a differential pressure sensor positioned and arranged so one side of the sensor 43 is exposed to fluid on one side of the bluff body 40 and the opposite side of the sensor 43 is exposed to fluid on the opposite side of the bluff body 40. Pressure fluctuations will occur on opposite sides of the bluff body 40 as vortices are formed on alternating sides of the bluff body 40. It is to be understood that the sensor 43 can be positioned elsewhere within the scope of the invention, such as on the bluff body 40 or downstream of the bluff body 40. It is also to be understood that any type of sensor that is capable of detecting the vortices formed by the bluff body 40 can be used.

The vortex flowmeter 25 includes a transmitter 46 that receives signals from the sensor 43 indicative of the frequency of vortex formation. The transmitter 46 includes one or more microprocessors or circuitry (not shown) configured to output a measurement signal indicative of fluid flow rate through the flowtube 28 based on the signals from the sensor 43. The transmitter 46 can be analog or digital. For example, the transmitter 46 can be configured to communicate with a distributed control system using protocols such as, but not limited to, 4-20 mA output, HART, Foundation Fieldbus, and Modbus.

The fluid carried by the pipeline may be a liquid, a gas, or a mixture of liquid and gas. The fluid may also contain solid particles, such as sand, dirt, dust, metal shavings, etc. that have the capacity to erode materials that are exposed to the abrasive fluid.

Still referring to FIG. 1, the transmitter 46 includes a user interface (UI) 47 comprising a front panel button 48 as well as a display screen 49. In an embodiment, four front panel buttons 48 are used, comprising an "ENTER" button, a "NEXT" button, a "BACK" button, and an "ESC" button, as will be further described below with reference to FIG. 3. In an embodiment, the display screen 49 comprises a liquid crystal display with two to four lines of 8-16 characters per line. In an embodiment, the UI 47 is capable of displaying one or more use case identifiers that each represent an expected usage of the flowmeter. In an embodiment, a selection of the one or more use case identifiers is received that corresponds to a selected use case. The selection is received through the use of the four front panel buttons 48. According to aspects of the invention, a formatted hierarchical tree of vortex flowmeter configuration nodes associated with the selected use case is generated based on the received selection and displayed on the user interface.

Figure 2:
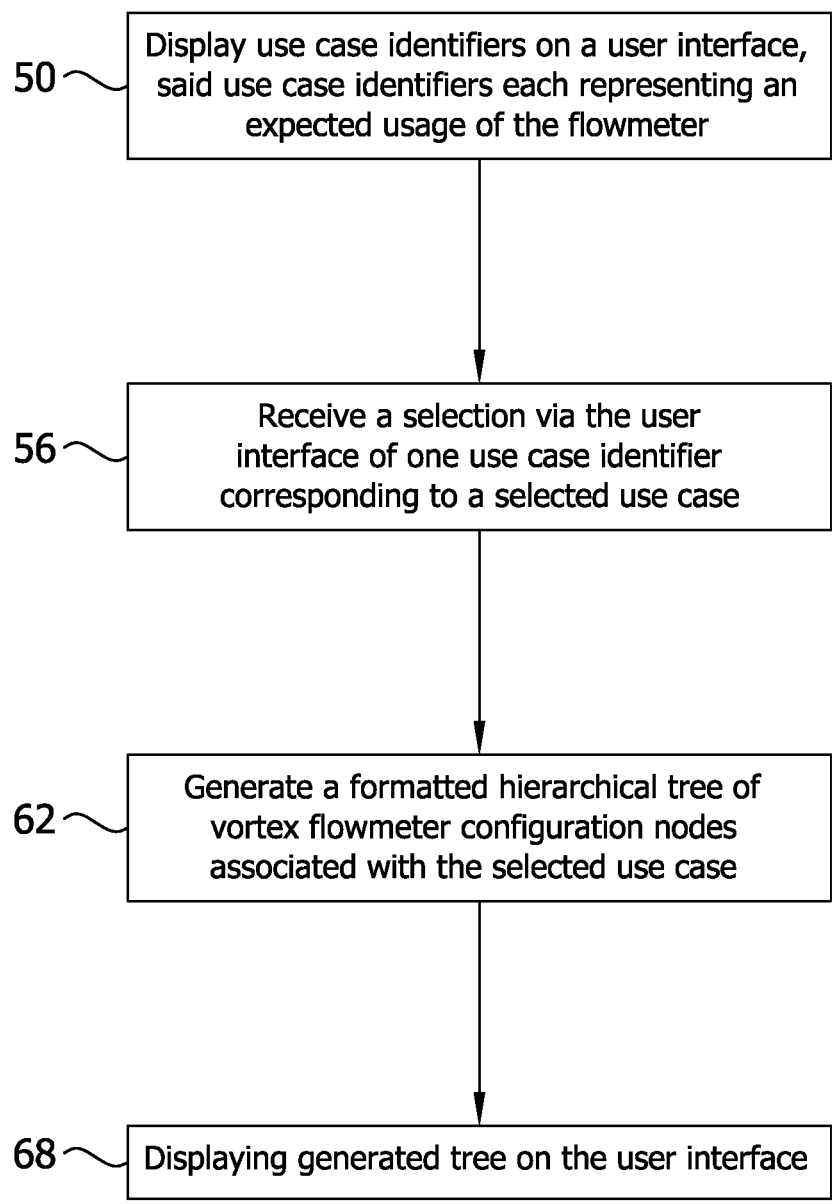
FIG. 2 depicts an exemplary process of vortex flowmeter menu configuration using personality-based, enhanced menu visibility masking according to one aspect of the present invention.

FIG. 2 depicts an exemplary process of vortex flowmeter menu configuration using enhanced menu visibility masking based on personality or use case according to one aspect of the present invention. The process begins at 50 where use case identifiers are displayed on a user interface, the use case identifiers each representing an expected usage of the flowmeter. At 56, a selection is received via the user interface of one use case identifier corresponding to a selected use case. At 62, a formatted hierarchical tree of vortex flowmeter configuration nodes associated with the selected use case is generated. Finally, at 68, the generated tree is displayed on the user interface.

Still referring to FIG. 2, in an embodiment, the vortex flowmeter configuration nodes comprise information items related to the protocol utilized by the device. In an alternative embodiment, the protocol comprises at least one of Hart protocol, FoxCom protocol, and Foundation Fieldbus protocol. In an alternative embodiment, the vortex flowmeter configuration nodes comprise information items related to configuration checks utilized by the flowmeter in the selected use case. In an embodiment, the configuration checks comprise one or more of: Pulse_Available, Pulse_Totalizer, MA_Live, MA_Fixed, Pressure_Live, Ecep, GasPurge, Pipe_Mate, Pipe_Piping, LIQUID, GAS, and VAPOR, which are configuration checks that are specific to flowmeters such as the I/A SERIES VORTEX FLOWMETER MODEL 84 available from Invensys Systems, Inc.

With further reference to FIG. 2, in an embodiment, the vortex flowmeter configuration nodes comprise information items related application specific parameters utilized by the flowmeter in the selected use case. In an embodiment, the application specific parameters are also referred to as "personalities". In an embodiment, the application specific parameters further comprise one or more of: M84C, M84, M84LowPower, OilandGas, Produced Water, Steam, Gas, SaturatedSteam, and a user-defined fluid selection, which are application specific parameters that are specific to the flowmeter model described above. In an embodiment, the user-defined fluid selection is a user-defined application specific parameter that allows for a user to further customize a flowmeter configuration menu according to the needs of the user in a specific use case. In an embodiment, the application specific parameters further comprise pick lists, as will be described in further detail with reference to FIG. 7. In an embodiment, a pick list mask is applied based on the application specific parameter to determine visibility of each record in the pick list.

With further reference to FIG. 2, in an embodiment, generating the formatted hierarchical tree of vortex flowmeter configuration nodes further comprises generating nodes that are displayed as active on the user interface based on the received selection, as will be described further below with reference to an example using engineering units (Egu). In an embodiment, after completion of the configuration process as depicted in FIG. 2, as a menu node is entered, the program flow checks each of three visibility layers comprising a protocol layer, a configuration layer, and an application specific parameter layer. In an embodiment, provided all three layers indicate the node is visible, the node is shown on the display, otherwise the node is not displayed and program flow moves to the next node in the fixed menu tree.

Advantageously, the process depicted in FIG. 2 provides for distinguishing the visibility of menu nodes based on, among other things, protocol limitations, configuration limitations, and hardware limitations. In an embodiment, the process depicted in FIG. 2 supports visibility settings for nodes that are configurable by the user. Also, in an embodiment, the process depicted in FIG. 2 minimizes the use of flash memory and more effectively allocates processor resources in at least two ways: by storing visibility check selections (such as the configuration nodes at 62) as individual bit field elements in C++ structures, and by supporting direct Boolean logical testing of the individual bit field elements. As a non-limiting example, in an embodiment, non-bit field implementation requires as much as 6000 bytes of flash memory storage, whereas, in an embodiment, bit field implementation requires 600 bytes of flash memory storage. In an embodiment, supporting direct Boolean logical testing of the individual bit field elements minimizes endian dependent code, as well as compiler dependent code. Advantageously, in addition to reduced memory requirements, the process depicted in FIG. 2 provides for more efficient processing, in that fewer menu nodes must be navigated by the user to configure the flowmeter according to the user's particular application.

Figure 3:
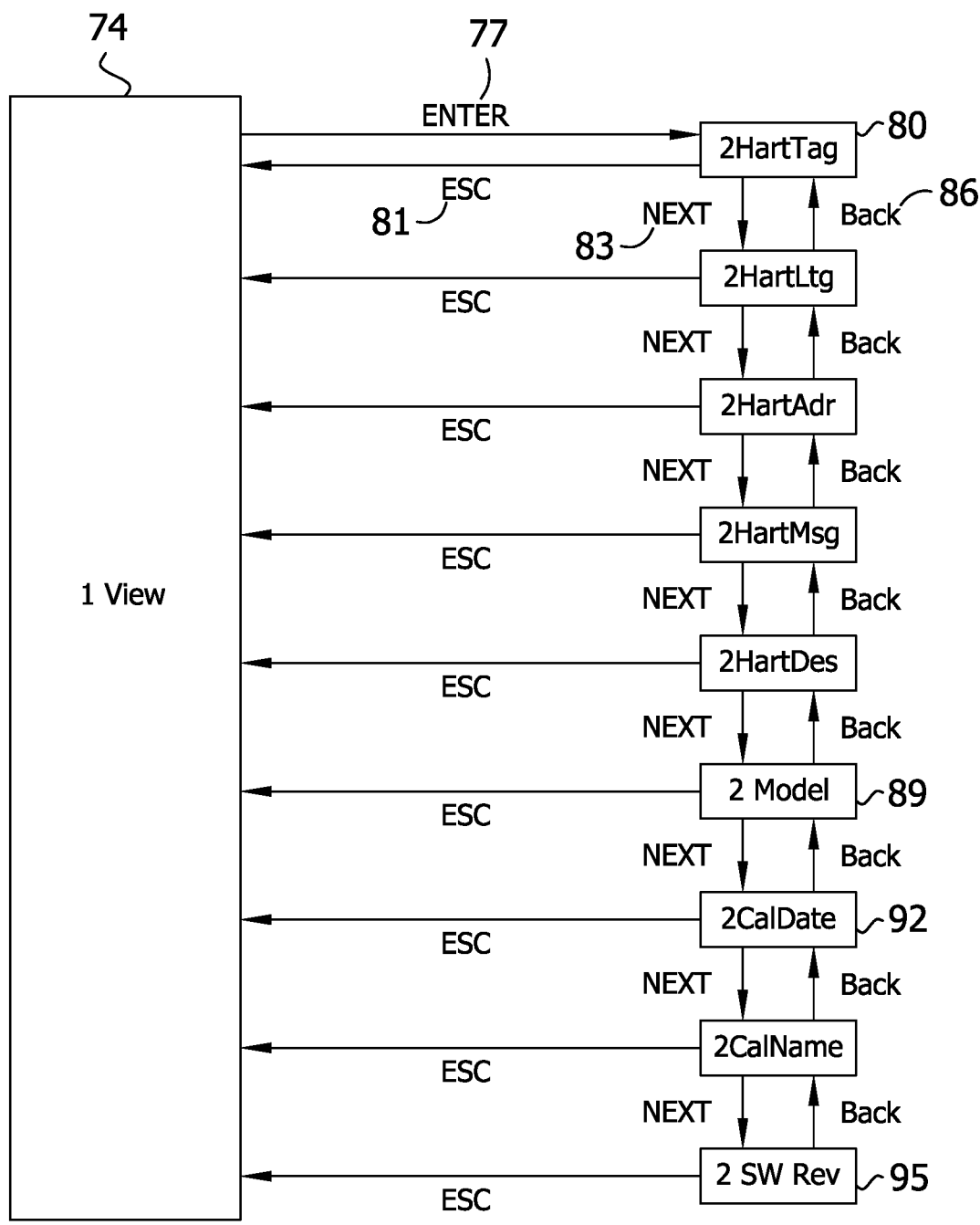
FIG. 3 depicts an exemplary process of navigating a fixed hierarchical menu tree of nodes via a four button front panel display in accordance with one embodiment of the present invention.

FIG. 3 depicts an exemplary process of navigating a hierarchical tree of vortex flowmeter configuration nodes via a four button front panel display in accordance with one embodiment of the present invention. In an embodiment, a menu tree with redundant (or duplicate) menu tree branches is replaced at least in part by the use of menu modes, also called menu modes of behavior. As indicated at 74, the process depicted in FIG. 3 takes place in "View Only" menu mode. In this menu mode, the menu tree is shown with nodes retaining their current visibility settings; for pick lists or user enterable fields only the current selection or an option to enter a selection is shown, and no user entries or selections are allowed. In an embodiment, a further menu mode of behavior for the menu tree is available that comprises the "Setup/Normal" menu mode. In this menu mode, the menu tree is again shown with nodes retaining their previous visibility settings; however, for pick lists or user enterable fields, personality masking and limits are applied.

In an embodiment, another mode of behavior for the menu tree is available that comprises the "Advanced" menu mode. In the Advanced menu mode, the menu tree is shown without nodes retaining their previous visibility settings; and for pick lists or user enterable fields only safety limits are applied and all options are shown. It is to be understood that the Advanced menu mode provides for greater flexibility during menu configuration, in that if the application of the flowmeter remains generalized, the menu tree available to the user during configuration will present a generalized sequence of menus that are selectable by the user. In other words, in the Advanced menu mode, all options for all choices are shown, overriding any visibility checks. In an embodiment, access to the Advanced menu mode is protected by a password protected menu node. In an embodiment, the password protected menu node enables the selection of well-defined ECEP features (known in the art as configuration settings which conform to standards such as administrative regulations) in a manner that is independent of the configuration code that applies configuration settings that are specific to the flowmeter being used (known in the art as the Model Code).

In an embodiment, the ECEP selection is related to configuration dependency checks. In an embodiment, the ECEP selection is further related to predefined modes of behavior. In an embodiment, personality checks, as will be further defined herein, are downloadable to support ECEP selections related to configuration dependency checks and predefined modes of behavior. In an embodiment, configuration code definitions particular to the flowmeter used are also downloadable. In an embodiment, the selection of ECEP features further comprises relating the ECEP selection to modes of behavior that have been newly defined, and that require a separate code base.

In an embodiment, the well-defined ECEP features further comprise: separation of amplitude and low flow cut in (LFCI); customization of the alpha coefficient; and customization of the bore diameter. In an embodiment, the ECEP feature is stored in a parameter that is factory writeable, such that the ECEP feature can be configured by being set in the factory, as well as by being set in the field in Advanced menu mode. In a further embodiment, the menu mode of the menu as described above, as well as the personality check as will be described in further detail below, are stored in factory writeable parameters.

With further reference to FIG. 3, four front panel buttons of a vortex meter display allow for navigation of the flowmeter menu. FIG. 3 depicts a user navigating from the "View Only" mode 74 by pressing the "ENTER" 77 button, allowing a user to navigate to a menu node such as "HartTag" 80, a HART protocol specific identification parameter. A user can return to the "View Only" mode 74 by pressing the "ESC" 81 button. By using the additional buttons, the user can navigate through additional menu nodes. In an embodiment, the user presses the "NEXT" 83 button to navigate away from the "2HartTag" menu node, and presses the "BACK" 86 button to return to the "2HartTag" menu node. In an embodiment, the user can navigate through additional menu nodes using the Next and Back buttons, such as "2 Model" 89, where the model number of the flowmeter can be designated, "2CalDate" 92, where the last calibration date of the flowmeter can be entered, and "2 SW Rev" 95, which allows the user to enter a software revision number.

Figure 4:
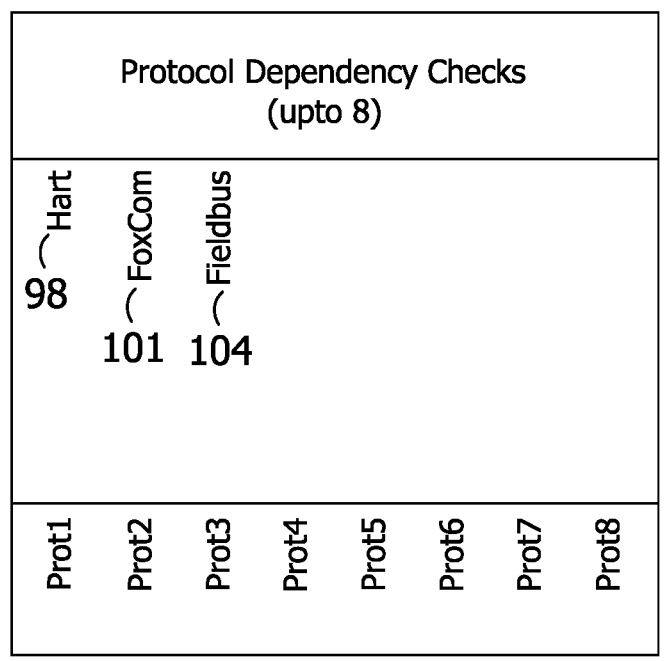
FIG. 4 is an exemplary depiction of menu protocol visibility checks utilized by a flowmeter device in accordance with one embodiment of the present invention.

FIG. 4 is an exemplary depiction of menu protocol checks utilized by a flowmeter device in accordance with one embodiment of the present invention. In an embodiment, the protocol checks comprise a display of information items related to communications protocols utilized by the flowmeter in the selected use case. In an embodiment, the communications protocols comprise Hart 98 protocol, FoxCom 101 protocol, and Fieldbus 104 protocol. In an embodiment, the list of potentially available protocols is based upon entries in a database. In an embodiment, the database comprises an excel spreadsheet including data as well as macros to manipulate the data. In an embodiment, the menu protocol checks comprise a first layer of three hierarchical layers for node visibility. In an embodiment, if a column is checked by a user, the node is visible for the protocol, and the visibility of nodes in the formatted hierarchical tree of vortex flowmeter configuration nodes are affected in part based on the column checked by the user. If no columns are checked, no protocols are set, and the visibility of configuration nodes in the formatted hierarchical tree of vortex flowmeter configuration nodes is protocol independent.

FIG. 5 is an exemplary depiction of configuration checks utilized by a flowmeter device in accordance with one embodiment of the present invention. In an embodiment, the configuration checks comprise a display of information items related to configuration checks utilized by the flowmeter in the selected use case. In an embodiment, the configuration checks comprise Pulse_Available 107, Pulse_Totalizer 110, MA_Live 113, MA_Fixed 116, Pressure_Live 119, Ecep 122, GasPurge 125, Pipe_Mate 128, and Pipe_Piping 131, LIQUID 134, GAS 137, and VAPOR 140. In an embodiment, the list of potentially available configuration checks is based upon entries in a database. In an embodiment, the database comprises an excel spreadsheet. In another embodiment, the configuration visibility check comprises a second layer of three hierarchical layers affecting node visibility. In an embodiment, if a column is checked by a user, the specified configuration check is performed.

FIG. 6 is an exemplary depiction of personality checks utilized by a flowmeter device in accordance with one embodiment of the present invention. In an embodiment, the personality checks comprise a display of information items related to application specific parameters utilized by the flowmeter in the selected use case. In another embodiment, the personality checks comprise M84C 143, M84 146, M84LowPower 149, OilandGas 152, Produced Water 155, Steam 158, Gas 161, and SaturatedSteam 164. In an embodiment, the personality checks further comprise a user-defined fluid selection. In an embodiment, the list of potentially available personality checks is based upon entries in a database. In an embodiment, the database comprises an excel spreadsheet. In an embodiment, the personality selections further comprise personality checks as a third of three hierarchical layers affecting node visibility. In an embodiment, if a column is checked, a node that is related to the selected use case is visible when the specified personality is active. In an embodiment, a node contains a pick list as described in further detail in FIG. 7. In an embodiment, the personality specific pick list mask is applied to determine visibility of each record in the pick list. In an embodiment, personality checks are downloadable in the field to support customer-specific requests regarding the functionality of the menu engine. In an embodiment, the downloadable personality checks further comprise ECEP selections related to configuration dependency checks and predefined modes of behavior.

Figure 7:
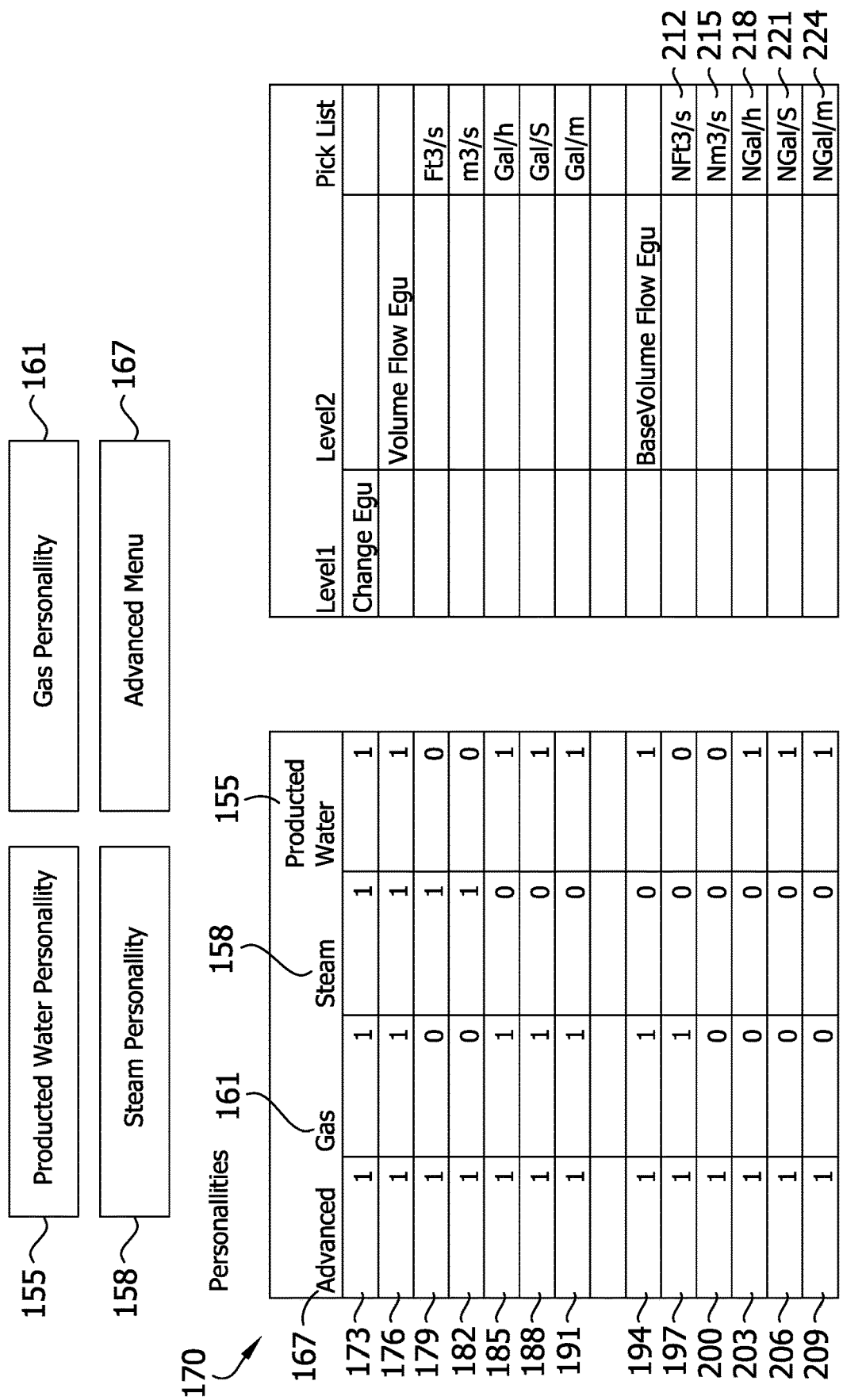
FIG. 7 is a spreadsheet demonstrating personality-based pick list masking in accordance with one embodiment of the present invention.

FIG. 7 is a spread sheet demonstrating personality based pick list masking in accordance with one embodiment of the present invention. FIG. 7 demonstrates which engineering units (EGUs) will be active based on the personality selection of the user. In other embodiments, additional pick lists are included. The chart depicted in FIG. 7 includes four personalities: Produced Water 155, Steam 158, Gas 161, and Advanced 167. In other embodiments, additional personalities are included. In an embodiment, the Advanced 167 personality overrides personality and other visibility checks, rendering all nodes and pick lists visible, as previously described.

Still referring to FIG. 7, a chart 170 including the four personalities of this non-limiting example indicates whether a node is masked after a personality is selected. As indicated on the chart, "1" represents a visible node, "0" represents a masked node. In an embodiment, a "Change Egu" row 173 shows that regardless of the personality selected, the "Change Egu" node will be visible. Further, as indicated by "Volume Flow Egu" row 176, the "Volume Flow Egu" node is visible regardless of the personality selected. However, in an embodiment, as indicated by the "BaseVolume Flow Egu" row 179, the "BaseVolume Flow Egu" node is masked when the Steam 158 personality is selected. It is to be understood that in an embodiment, masking a node such as the "BaseVolume Flow Egu" node results in masking the entire pick list associated with the node, the entire pick list being represented in this example by the rows including "NFt3/s" row 197 up to and including "NGal/m" row 209. It is to be understood that in an embodiment, an individual Egu is alternatively active or masked based on the selected personality. In an embodiment, selecting the Produced Water 155 personality results in masking "NFt3/s" 212 and "Nm3/s" 215, and results in making "NGal/h" 218, "NGal/S" 221, and "NGal/m" 224 visible.

Still referring to FIG. 7, it is to be understood that in an embodiment, personalities are used to control the behavior of the meter, as well as the limits applied by the meter to the measurement. As a non-limiting example, a "heart beat" feature for the detection of process flow is enabled. The heart beat feature allows for the pulse output of the meter to fall to a frequency below that of the low flow cut in (LFCI) frequency when certain conditions are detected. The low flow cut in frequency is known in the art as a "forced zero" that avoids certain low flow measurements that typically result from process noise such as hydrodynamic fluctuations, mechanical vibration, and electrical interference. Among the certain conditions include a determination that an input signal with a frequency above the upper range limit (URL) for liquids is detected. It is to be understood that controlling the behavior of the meter illustrates an additional feature of the use of personalities; the choice of a personality affects the display on a menu navigated by a user, as well as the run time code implemented by the flowmeter.

It is to be understood that traditional flowmeter applications may not have necessarily required certain functionalities that are necessary for more current, non-traditional applications of vortex flowmeters. As one non-limiting example, a fast response to a sudden input is useful in non-traditional flowmeter applications such as produced water applications. Other non-limiting examples of functionalities necessary for non-traditional applications of vortex flowmeters include varying the sampling rate of the flowmeter, as well as the use of alternative algorithms to process the sampled signal. In this manner, the menu engine provides the functionality to present menus to the user during the configuration process that take into account non-traditional applications of vortex flowmeters. In an embodiment, the menu engine provides this functionality while streamlining the presentation of the configuration menu based on the response of the user.

Figure 8A:
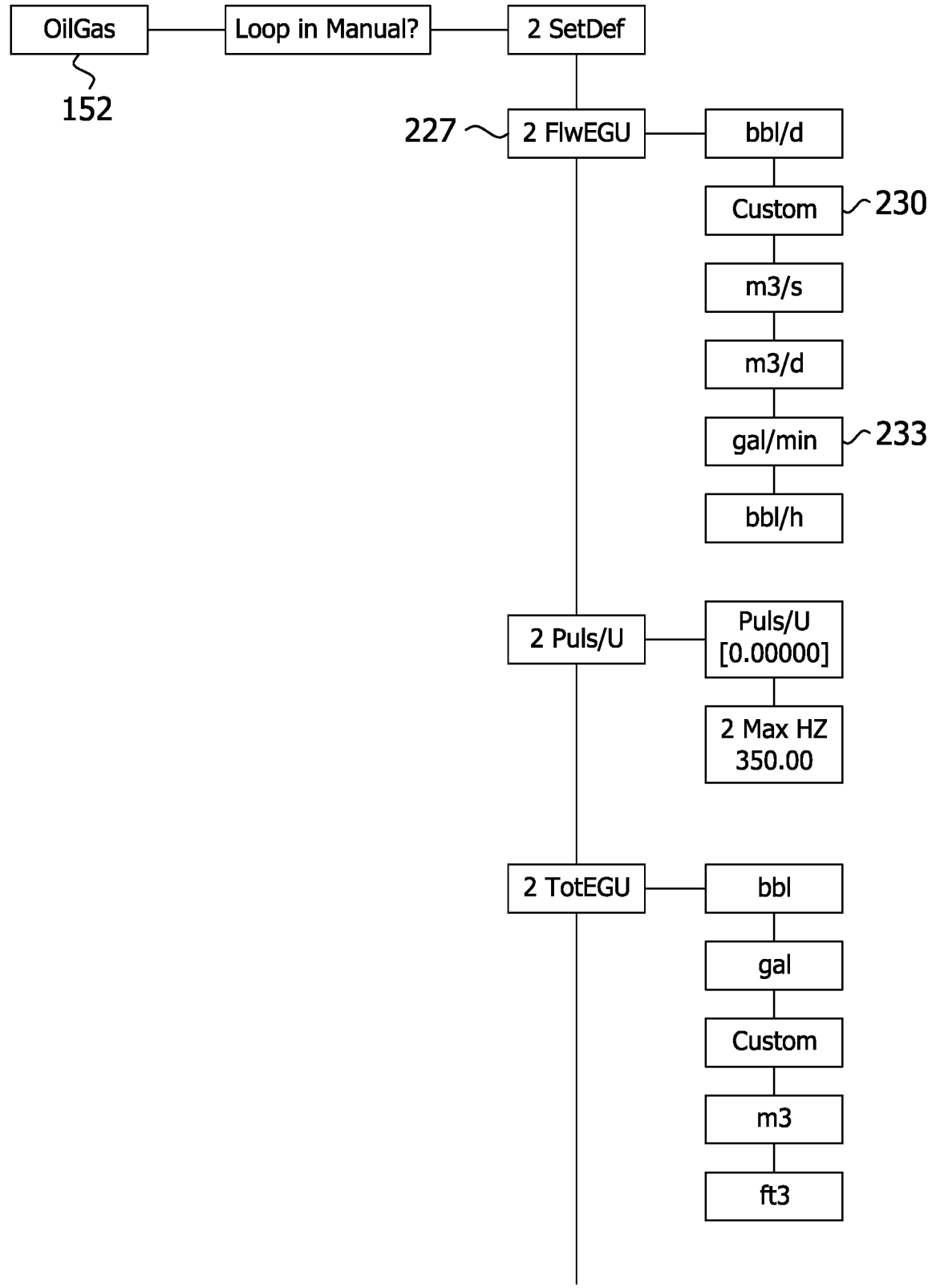
FIG. 8A is an exemplary depiction of a portion of a menu tree demonstrating masking as applied to a node in accordance with one aspect of the present invention.
Figure 8B:
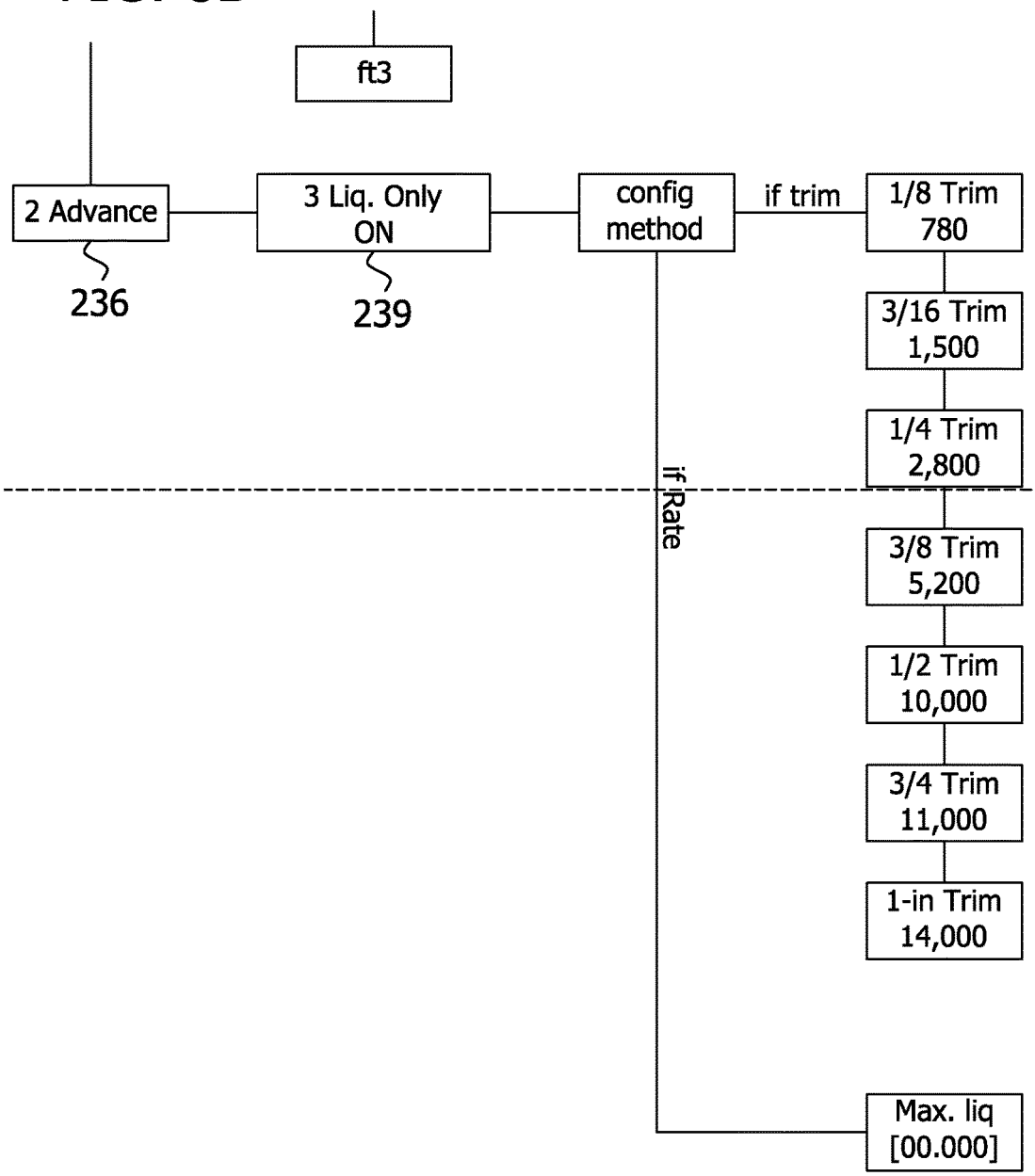
FIG. 8B is an exemplary depiction of an additional portion of a menu tree demonstrating masking as applied to a node in accordance with one aspect of the present invention.

FIGS. 8A-8B, collectively FIG. 8, are exemplary depictions of masking as applied to a menu node in accordance with one aspect of the present invention. The menu tree of FIG. 8A depicts a portion of the OilandGas 152 personality menu tree. In other embodiments, additional or alternative menu tree configurations are included. As depicted by FIG. 8A, Level 2 of the OilandGas 152 personality menu tree includes menu nodes, such as "2 FIwEGU" 227. In an embodiment, the menu nodes further include pick lists such as "Custom" 230 or "gal/min" 233. Level 2 of the OilandGas 152 personality menu tree continues at FIG. 8B with the "2 Advance" 236 menu node. It is to be understood that, as previously described, after completion of the configuration process as depicted in FIG. 2, as a menu node is entered, the program flow checks each of the three visibility layers. Provided all three layers indicate the node is visible, the node is shown on the display, otherwise the node is not displayed and program flow moves to the next node in the fixed menu tree. In an embodiment, as depicted in FIG. 8B, when LIQUID 134 is set to ON, as depicted by the "3 Liq. Only ON" node 239, a configuration check of the second hierarchical layer results in the "2 HBeatHZ 0.800000" node 242 being visible. In an embodiment, when LIQUID 134 is not selected, the "2 HBeatHZ 0.800000" node 242 is not visible following a configuration check of the second hierarchical layer.

FIGS. 9A-9B, collectively FIG. 9, depict a vortex flowmeter 245 with, among other things, software executable instructions stored on the memory device of the flowmeter providing a menu navigation component in accordance with one embodiment of the present invention. FIG. 9A is a cross section of a vortex flowmeter 245 in accordance with one aspect of the present invention. FIG. 9A depicts a flowtube 248 having a flowtube wall 251 defining a passage for flow of a process fluid through the flowtube 248. FIG. 9B is a cross section of a front elevation of a vortex flowmeter in accordance with one embodiment of the present invention. A bluff body 254 is positioned to generate vortices in the process fluid as the process fluid flows through the passage. A sensor assembly 257 extends into contact with the process fluid through a process penetration opening 260. In an embodiment, the sensor assembly 257 comprises a sensor body 263 positioned to seal the process penetration opening 260 to limit flow of process fluid from the passage out of the flowmeter 245 through the process penetration opening 260.

With further reference to FIGS. 9A-9B, in an embodiment, a vortex sensor housing 266 is secured to the sensor body 263, the vortex sensor housing 266 having a pair of pressure-responsive diaphragms 269 facing outwardly from opposite sides of the vortex sensor housing 266. In an embodiment, vortex sensor housing 266 houses a vortex sensor 272 positioned to detect motion of at least one of the pressure-responsive diaphragms 269 to detect vortices formed in the process fluid as the process fluid flows past the bluff body 254. In an embodiment, the vortex flowmeter further comprises a user interface in which tree-like data structures are displayed and selected on a workspace. In an embodiment, the flowmeter further comprises a processor capable of executing software executable instructions, a memory device coupled to the processor, and software executable instructions stored on the memory device. In an embodiment, the software executable instructions provide, among other things, a menu navigation component enabling user configuration of the electronic device as previously described in the discussion above.

It is to be understood that in an embodiment, for each personality supported by the vortex meter, there is a separate set of database defaults as entered in a parameter database, also called a parameter spread sheet (parameters.xls). In an embodiment, the database defaults are used to initialize the meter's database and to initialize the meter's configuration to reflect the selected personality. In an additional embodiment, the meter's configuration can be set back to personality defaults via a "Set Defaults" menu node available in an Advanced mode. It is to be understood that setting personality defaults in this manner provides users with a quick way to configure a flowmeter for a given use case, such as a personality.

It is to be understood that in an embodiment, data related to the layout of the menu tree is provided by a database, also called a menu spread sheet (UserMenu.xls). In an embodiment, the menu spread sheet provides menu protocol visibility selections, menu configuration dependency selections, and menu personality selections. In an embodiment, the data and macros in the parameters.xls and the UserMenu.xls spread sheets are combined in a single database. In an embodiment, the creation of new personalities is accomplished by editing the single database, such that only one entry is required, and such that all target code generation uses a common data source.

In an embodiment, entries and selections in the menu spread sheet and the parameter spread sheet provide for the auto generation of data structures used by the menu engine. In an embodiment, a software component reads the database provided by the UserMenu.xls menu tree and generates diagrams that account for the three hierarchical layers of visibility masking. In a further embodiment, the software component further accounts for modes of behavior of the menu tree.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. A vortex flowmeter for measuring a flow rate of a fluid, the flowmeter comprising:
   a flowtube;
   a bluff body positioned in the flowtube for shedding vortices in the fluid as the fluid flows through the flowtube;
   a vortex sensor for detecting the vortices;
   a processor configured to determine a flow rate of the fluid when the fluid flows through the flowtube as a function of the detected vortices;
   a user interface; and
   a memory device coupled to the processor, the memory device storing one or more software components that, when executed, configure the the processor for implementing a menu navigation engine to enable user configuration of the flowmeter, the menu navigation engine:
   displaying one or more use case identifiers on the user interface, the use case identifiers each representing an expected usage of the flowmeter;
   receiving a selection of one of the use case identifiers via the user interface, the received selection corresponding to a selected use case;
   generating, based on the received selection, a formatted hierarchical tree of vortex flowmeter configuration nodes associated with the selected use case;
   displaying the generated tree on the user interface;
   receiving a configuration selection via the user interface based on the formatted hierarchical tree; and
   configuring the vortex flowmeter for the use case associated with the selected use case identifier based on the received configuration selection without receiving any selections via the user interface based on any other formatted hierarchical tree,
   wherein the formatted hierarchical tree masks at least one of the vortex flowmeter configuration nodes of a complete hierarchical tree and is different from when another use case is selected, and wherein the complete hierarchical tree includes one or more vortex flowmeter configuration nodes associated with each of the use cases.

2. The vortex flowmeter of claim 1, wherein the vortex flowmeter configuration nodes comprise information items related to a communications protocol utilized by the flowmeter in the selected use case.

3. The vortex flowmeter of claim 2, wherein the protocol comprises at least one of a Hart protocol, a FoxCom protocol, and a Foundation Fieldbus protocol.

4. The vortex flowmeter of claim 1, wherein the vortex flowmeter configuration nodes comprise information items related to configuration checks utilized by the flowmeter in the selected use case.

5. The vortex flowmeter of claim 4, wherein the configuration checks comprise one or more of: Pulse_Available, Pulse_Totalizer, MA_Live, MA_Fixed, Pressure_Live, Ecep, GasPurge, Pipe_Mate, Pipe_Piping, LIQUID, GAS, and VAPOR.

6. The vortex flowmeter of claim 1, wherein the vortex flowmeter configuration nodes comprise information items related application specific parameters utilized by the flowmeter in the selected use case.

7. The vortex flowmeter of claim 6, wherein the application specific parameters comprise one or more of: M84C, M84, M84LowPower, OilandGas, ProducedWater, Steam, Gas, SaturatedSteam, and a user-defined fluid selection.

8. A method for configuring a vortex flowmeter, the flowmeter comprising a processor, a user interface, and a memory device coupled to the processor, the memory device storing one or more software components that, when executed, configure the processor for enabling user configuration of the flowmeter, the method comprising:
   displaying one or more use case identifiers on the user interface, the use case identifiers each representing an expected usage of the flowmeter;
   receiving a selection of one of the use case identifiers via the user interface, the received selection corresponding to a selected use case;
   generating, based on the received selection, a formatted hierarchical tree of vortex flowmeter configuration nodes associated with the selected use case, wherein the vortex flowmeter configuration nodes comprise information items related application specific parameters utilized by the flowmeter in the selected use case;
   displaying the generated tree on the user interface;

receiving a configuration selection via the user interface based on the formatted hierarchical tree; and configuring, by the processor, the vortex flowmeter for the use case associated with the selected use case identifier based on the received configuration selection without receiving any selections via the user interface based on any other formatted hierarchical tree, wherein the formatted hierarchical tree masks at least one of the vortex flowmeter configuration nodes of a complete hierarchical tree and is different from when another use case is selected, and wherein the complete hierarchical tree includes one or more vortex flowmeter configuration nodes associated with each of the use cases.

9. The method of claim 8, wherein the vortex flowmeter configuration nodes comprise information items related to a communications protocol utilized by the flowmeter in the selected use case.

10. The method of claim 9, wherein the protocol comprises at least one of a Hart protocol, a FoxCom protocol, and a Foundation Fieldbus protocol.

11. The method of claim 8, wherein the vortex flowmeter configuration nodes comprise information items related to configuration checks utilized by the flowmeter in the selected use case.

12. The method of claim 11, wherein the configuration checks comprise one or more of: Pulse_Available, Pulse_Totalizer, MA_Live, MA_Fixed, Pressure_Live, Ecep, GasPurge, Pipe_Mate, Pipe_Piping, LIQUID, GAS, and VAPOR.

13. The method of claim 8, wherein the application specific parameters comprise one or more of: M84C, M84, M84LowPower, OilandGas, ProducedWater, Steam, Gas, SaturatedSteam, and a user-defined fluid selection.

* * * * *